US012105463B2

(12) United States Patent
Nakazawa et al.

(10) Patent No.: US 12,105,463 B2
(45) Date of Patent: Oct. 1, 2024

(54) IMAGE FORMING APPARATUS

(71) Applicant: FUJIFILM Business Innovation Corp., Tokyo (JP)

(72) Inventors: Shota Nakazawa, Kanagawa (JP); Hiroki Ando, Kanagawa (JP); Hirofumi Hamada, Kanagawa (JP); Hirofumi Iida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/296,378

(22) Filed: Apr. 6, 2023

(65) Prior Publication Data

US 2024/0192632 A1 Jun. 13, 2024

(30) Foreign Application Priority Data

Dec. 9, 2022 (JP) ................................ 2022-197482

(51) Int. Cl.
*G03G 21/06* (2006.01)
*G03G 21/08* (2006.01)

(52) U.S. Cl.
CPC ............ *G03G 21/06* (2013.01); *G03G 21/08* (2013.01)

(58) Field of Classification Search
CPC ............................... G03G 21/06; G03G 21/08
See application file for complete search history.

(56) References Cited

U.S. PATENT DOCUMENTS 9,829,836 B2 11/2017 Shibuya
2010/0239280 A1* 9/2010 Inoue .................... G03G 21/08 399/186
2013/0004204 A1* 1/2013 Hagiwara ............. G03G 21/08 399/128
2016/0291499 A1* 10/2016 Shibuya ............ G03G 15/0189
2023/0297003 A1* 9/2023 An .................... G03G 15/0189 399/50

FOREIGN PATENT DOCUMENTS

JP 6478616 3/2019
JP 2019139145 8/2019

* cited by examiner

*Primary Examiner* — Carla J Therrien
(74) *Attorney, Agent, or Firm* — JCIPRNET

(57) ABSTRACT

An image forming apparatus includes a transfer body that rotates and transfers a transferred image to a target transfer body at a transfer position, plural image holding members that rotate together with the transfer body at different positions along a rotation direction of the transfer body while outer peripheral surfaces of the image holding members come into contact with the transfer body, the image holding members on which a charge erasing operation is sequentially performed after images held on the outer peripheral surfaces sequentially transferred to the transfer body, and in which the charge erasing operation on all the image holding members has been ended, and then rotations of all the image holding members are stopped, a first charge erasing unit that erases charges of an outer peripheral surface of at least one image holding member other than a most downstream image holding member disposed on a most downstream side of the rotation direction with respect to the transfer position, among the plural image holding members, and a second charge erasing unit that erases charges of an outer peripheral surface of the most downstream image holding member and has a charge erasing time shorter than a charge erasing time of the first charge erasing unit.

5 Claims, 6 Drawing Sheets

IMAGE FORMING APPARATUS

CROSS-REFERENCE TO RELATED APPLICATIONS

This application is based on and claims priority under 35 USC 119 from Japanese Patent Application No. 2022-197482 filed Dec. 9, 2022.

BACKGROUND

(i) Technical Field

The present invention relates to an image forming apparatus.

(ii) Related Art

JP2019-139145A discloses an image forming apparatus including a contact charging member, a charge erasing lamp, a control unit, and an environment sensor. The contact charging member charges a surface of a photosensitive body for electrophotography. The charge erasing lamp erases charges by irradiating the surface of the photosensitive body after developing and transfer. The control unit controls an image formation operation including a charging bias voltage to be applied to the contact charging member, and turning-on and turning-off of the charge erasing lamp. The environment sensor detects a use environment during image formation. The control unit determines whether the charge erasing lamp is turned on or off during the image formation, based on the detected use environment.

JP6478616B discloses an image forming apparatus including a first image forming station, a second image forming station, and a transfer unit. The first image forming station includes a first photosensitive body, a first charging unit that charges the first photosensitive body, a first exposing unit, and a first developing unit. The first exposing unit exposes the first photosensitive body charged by the first charging unit, based on first image data. The first developing unit develops an electrostatic image formed on the first photosensitive body by the first exposing unit, with a toner. The second image forming station includes a second photosensitive body, a second charging unit, a second exposing unit, and a second developing unit. The second charging unit charges the second photosensitive body by applying only a DC voltage. The second exposing unit exposes the second photosensitive body charged by the second charging unit, based on second image data. The second developing unit develops an electrostatic image formed on the second photosensitive body by the second exposing unit, with a toner. The transfer unit electrostatically transfers a toner image formed on the first photosensitive body and a toner image formed on the second photosensitive body to an image receiving member in this order to be superimposed. The first image forming station does not include a charge erasing unit that optically erases charges of the first photosensitive body. The second image forming station includes a charge erasing unit that optically erases charges of the second photosensitive body, and a control unit that controls an operation of the charge erasing unit in accordance with the first image data.

SUMMARY

As an image forming apparatus, an image forming apparatus as follows is considered. The image forming apparatus includes a transfer body, a plurality of image holding members, a first charge erasing unit, and a second charge erasing unit. The transfer body rotates to transfer the transferred image to a target transfer body at a transfer position. The plurality of image holding members rotate together with the transfer body at different positions along a rotation direction of the transfer body while an outer peripheral surfaces of the image holding members come into contact with the transfer body, and a charge erasing operation is sequentially performed on the image holding members after the image held on the outer peripheral surface is sequentially transferred to the transfer body. After the charge erasing operation on all the image holding members has been ended, rotations of all the image holding members are stopped. The first charge erasing unit erases charges of the outer peripheral surface of at least one image holding member other than the most downstream image holding member disposed on the most downstream side of the rotation direction with respect to the transfer position among the plurality of image holding members. The second charge erasing unit erases charges of the outer peripheral surface of the most downstream image holding member.

In the image forming apparatus, in the plurality of image holding members, the charge erasing operation on all the image holding members has been ended, and then the rotations of all the image holding members are stopped. Thus, in a case where a charge erasing time of the second charge erasing unit that erases charges of the outer peripheral surface of the most downstream image holding member is the same as a charge erasing time of the first charge erasing unit, the time from completion of image transfer from any of the plurality of image holding members to the transfer body until the rotation of all the plurality of image holding members is stopped becomes longer.

Aspects of non-limiting embodiments of the present disclosure relate to an image forming apparatus that reduces a time from completion of image transfer from any one of a plurality of image holding members to a transfer body until rotations of all the plurality of image holding members are stopped, as compared with a case where a charge erasing time of a second charge erasing unit is the same as a charge erasing time of a first charge erasing unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a transfer body that rotates and transfers a transferred image to a target transfer body at a transfer position, a plurality of image holding members that rotate together with the transfer body at different positions along a rotation direction of the transfer body while outer peripheral surfaces of the image holding members come into contact with the transfer body, the image holding members on which a charge erasing operation is sequentially performed after images held on the outer peripheral surfaces sequentially transferred to the transfer body, and in which the charge erasing operation on all the image holding members has been ended, and then rotations of all the image holding members are stopped, a first charge erasing unit that erases charges of an outer peripheral surface of at least one image holding member other than a most downstream image holding member disposed on a most downstream side of the rotation direction with respect to the transfer position, among the plurality of image holding members, and a second charge erasing unit that erases charges of an outer peripheral surface of the most downstream image holding member and has a charge erasing time shorter than a charge erasing time of the first charge erasing unit.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment of the present invention will be described with reference to the drawings.

Image Forming Apparatus 10

Figure 1:
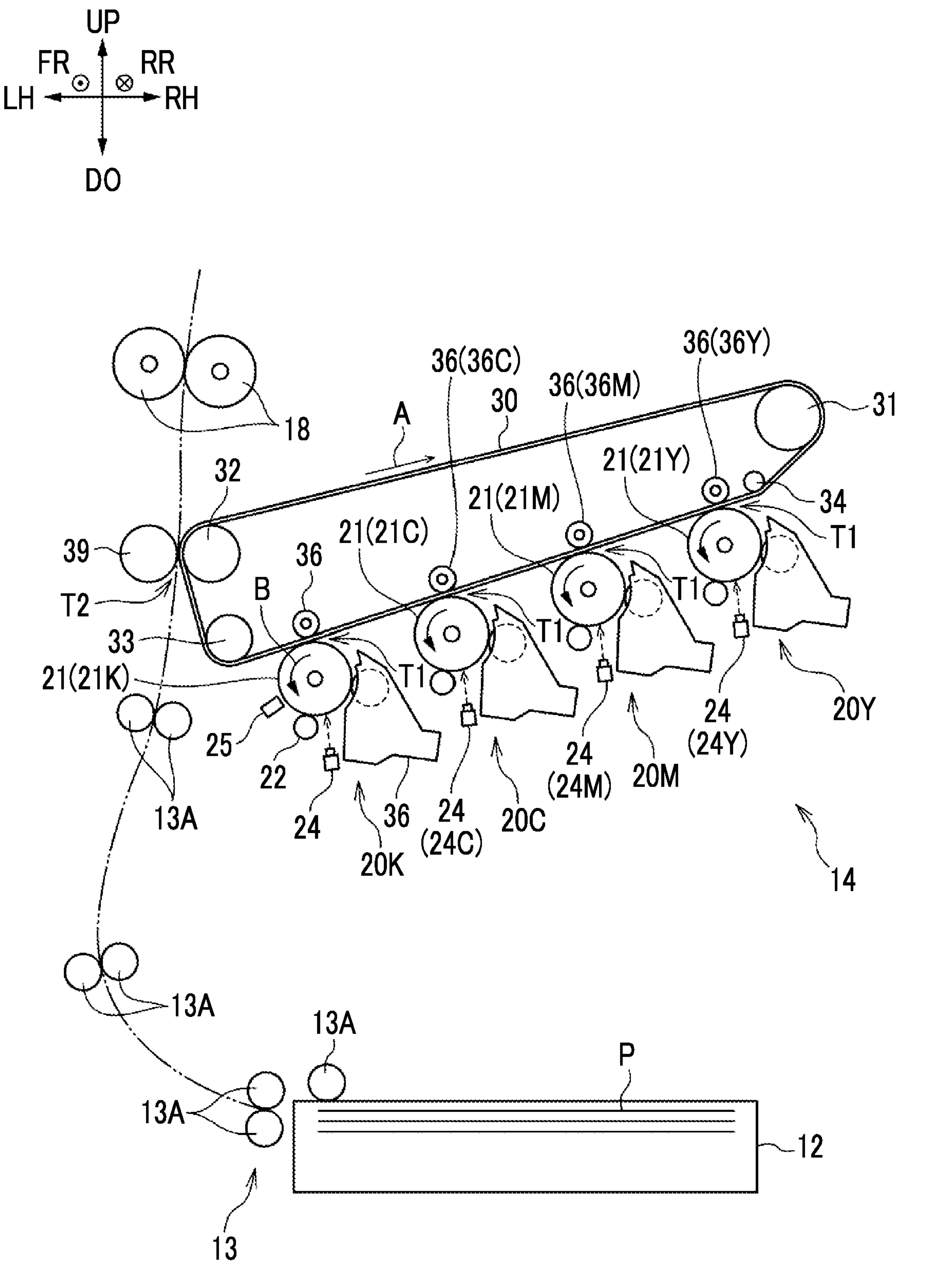
FIG. 1 is a schematic diagram showing an image forming apparatus according to the present exemplary embodiment.

The configuration of an image forming apparatus 10 according to the present exemplary embodiment will be described. FIG. 1 is a schematic diagram showing the image forming apparatus 10.

An arrow UP shown in FIG. 1 indicates an upper side (specifically, a vertical upper side) of the apparatus, and an arrow DO indicates a lower side (specifically, a vertical lower side) of the apparatus. An arrow LH shown in FIG. 1 indicates a left side of the apparatus, and an arrow RH indicates a right side of the apparatus. An arrow FR shown in FIG. 1 indicates a front side of the apparatus, and an arrow RR indicates a rear side of the apparatus. Since the directions are determined for convenience of description, the apparatus configuration is not limited to the directions. The word "apparatus" may be omitted in each direction of the apparatus. That is, for example, the "upper side of the apparatus" may be simply referred to as the "upper side".

In the following description, a "front-rear direction" may be used to mean "both a forward direction and a rearward direction" or "either the forward direction or the rearward direction". The "front-rear direction" can also be referred to as a lateral direction, a transverse direction, and a horizontal direction. A "right-left direction" can also be referred to as a lateral direction, a transverse direction, and a horizontal direction. An up-down direction, the right-left direction, and the front-rear direction are directions intersecting each other (specifically, directions perpendicular to each other).

In addition, a symbol in which "x" is described in "o" in FIG. 1 means an arrow from the front to the rear of the paper. In addition, a symbol in which "•" is described in "o" in FIG. 1 means an arrow from the rear to the front of the paper.

The image forming apparatus 10 shown in FIG. 1 is an apparatus that forms an image. Specifically, as shown in FIG. 1, the image forming apparatus 10 includes a medium accommodating section 12, a transport section 13, and an image forming section 14. Each section of the image forming apparatus 10 will be described below.

Medium Accommodating Section 12 and Transport Section 13

The medium accommodating section 12 is a section that accommodates a recording medium P in the image forming apparatus 10. The recording medium P accommodated in the medium accommodating section 12 is transported to the image forming section 14. The recording medium P accommodated in the medium accommodating section 12 is a target on which an image is formed by the image forming section 14. Examples of the recording medium P include paper and a film. Examples of the film include a resin film and a metal film. The recording medium P is not limited to the above description, and various recording media can be used.

The transport section 13 shown in FIG. 1 transports the recording medium P accommodated in the medium accommodating section 12 upward toward a discharge section (not shown). Specifically, as shown in FIG. 1, the transport section 13 includes a plurality of transport members 13A such as transport rolls, and transports the recording medium P by the transport members 13A. The transport member 13A may be, for example, a transport member such as a transport belt and a transport drum, and various transport members can be used.

Image Forming Section 14

The image forming section 14 shown in FIG. 1 forms an image on the recording medium P transported by the transport section 13. Specifically, the image forming section 14 forms a toner image (an example of an image) on the recording medium P by an electrophotographic method. In the present exemplary embodiment, as illustrated in FIG. 1, the image forming section 14 includes toner image forming units 20Y, 20M, 20C, and 20K (referred to as 20Y to 20K below), a transfer belt 30, and a primary transfer roll 36, a secondary transfer roll 39, and a fixing unit 18.

Transfer Belt 30, Primary Transfer Roll 36, Secondary Transfer Roll 39, and Fixing Unit 18

The transfer belt 30 is an example of a transfer body, and is a belt that rotates and transfers the transferred toner image (an example of an image) to the recording medium P (an example of a target transfer body) at a transfer position (corresponding to a secondary transfer position T2 described later).

In the present exemplary embodiment, as shown in FIG. 1, the transfer belt 30 is configured by an endless belt and is formed in an annular shape. The transfer belt 30 is wound around four winding rolls 31, 32, 33, and 34 having the front-rear direction as an axial direction. By rotationally driving at least one of the winding rolls 31, 32, 33, or 34, the transfer belt 30 rotates in the clockwise direction (direction indicated by an arrow A) in FIG. 1.

The primary transfer roll 36 is an example of a transfer unit, and as shown in FIG. 1, four primary transfer rolls 36 are provided. Each of the four primary transfer rolls 36 is disposed on an inner peripheral side of the transfer belt 30 and faces each of a photosensitive body 21 (described later) of the toner image forming units 20Y to 20K with the transfer belt 30 interposed therebetween. A space between each of the primary transfer rolls 36 and each photosensitive body 21 is set as a primary transfer position T1. The primary transfer roll 36 transfers the toner image held on an outer peripheral surface of each photosensitive body 21 to the transfer belt 30 at the primary transfer position T1.

The secondary transfer roll 39 faces the winding roll 32 with the transfer belt 30 interposed therebetween. A space between the secondary transfer roll 39 and the winding roll 32 is set as a secondary transfer position T2. The secondary transfer roll 39 transfers the toner image transferred to the transfer belt 30 to the recording medium P at the secondary transfer position T2.

The fixing unit 18 fixes the toner image transferred to the recording medium P by the secondary transfer roll 39 to the recording medium P.

Toner Image Forming Units 20Y to 20K

Each of the toner image forming units 20Y to 20K is a constituent unit that forms a toner image of each color (specifically, yellow, magenta, cyan, and black). Each of the toner image forming units 20Y to 20K includes the photosensitive body 21. Thus, a plurality of (specifically, four) photosensitive bodies 21 are provided. The photosensitive body 21 is an example of an image holding member, and is a structure that holds the toner image.

The four photosensitive bodies 21 rotate together with the transfer belt 30 at different positions along a rotation direction (direction indicated by the arrow A) of the transfer belt 30 while the outer peripheral surfaces of the photosensitive bodies 21 come into contact with the transfer belt 30. In the present exemplary embodiment, the photosensitive body 21 rotates in the counterclockwise direction (in a direction indicated by an arrow B) in FIG. 1.

A charging device 22, an exposing device 24, and a developing device 26 are provided around each of the four photosensitive bodies 21 in order from the upstream side in the rotation direction of the photosensitive body 21.

The charging device 22 is an example of a charging unit, and is a constituent unit that charges the outer peripheral surface of the photosensitive body 21. In the present exemplary embodiment, the charging device 22 is configured by, for example, a charging roll that charges the outer peripheral surface of the photosensitive body 21 in a state of being in contact with the photosensitive body 21. The charging device 22 may be, for example, a charging device that charges the photosensitive body 21 in a non-contact manner by discharging or the like, and various charging devices can be used.

The exposing device 24 is an example of an exposing unit, and is a constituent unit that exposes the outer peripheral surface of the photosensitive body 21. In the present exemplary embodiment, the exposing device 24 is configured by an exposing device in which a plurality of light emitting elements configured by LEDs or the like are arranged along a rotation axis direction (specifically, the front-rear direction) of the photosensitive body 21. As an example of the exposing device 24, for example, a device that performs scanning with light by a rotating polygonal mirror or the like may be used, and various exposing devices can be used.

In each of the toner image forming units 20Y to 20K, the charging device 22 charges the photosensitive body 21 (charging step). The exposing device 24 exposes the photosensitive body 21 charged by the charging device 22 to form a latent image (specifically, an electrostatic latent image) on the photosensitive body 21 (exposure step). The photosensitive body 21 holds the latent image formed by the exposing device 24. The developing device 26 develops the latent image held by the photosensitive body 21 (development step). As a result, a toner image of each color is formed on each of the four photosensitive bodies 21.

Each of the four photosensitive bodies 21 holds the toner image formed as described above on the outer peripheral surface. The toner image held on the outer peripheral surface is sequentially transferred to the transfer belt 30 at the primary transfer position T1 by the primary transfer roll 36.

Further, the toner image held on the outer peripheral surface of each of the four photosensitive bodies 21 is sequentially transferred to the transfer belt 30, and then a charge erasing operation described later is sequentially performed. In the four photosensitive bodies 21, the rotation of all the photosensitive bodies 21 is stopped after the charge erasing operation in all the photosensitive bodies 21 has been ended.

In the present exemplary embodiment, the four photosensitive bodies 21 are configured to be rotationally driven by a common drive source.

Charge Erasing Configuration in Each of Four Photosensitive Bodies 21

The toner image forming unit 20K includes a charge erasing lamp 25 that erases charges of the outer peripheral surface of the photosensitive body 21K. The charge erasing lamp 25 is disposed on the downstream side of the primary transfer position T1 in the rotation direction (direction indicated by the arrow B) of the photosensitive body 21K and on the upstream side of the charging device 22 (that is, a charging position). In the charge erasing lamp 25, by irradiating the outer peripheral surface of the photosensitive body 21K with light, the charges remaining on the outer peripheral surface of the photosensitive body 21K are released, and thus the charges of the outer peripheral surface of the photosensitive body 21K are erased.

On the other hand, the toner image forming units 20Y, 20M, and 20C (referred to as 20Y to 20C below) do not include the charge erasing lamp 25. Charges of outer peripheral surfaces of the photosensitive bodies 21Y, 21M, and 21C (referred to as 21Y to 21C below) are erased by the exposing devices 24Y, 24M, and 24C (referred to as 24Y to 24C below), and the primary transfer rolls 36Y, 36M, and 36C (referred to as 36Y to 36C below).

In each of the toner image forming units 20Y to 20C, each of the exposing devices 24Y to 24C irradiates the outer peripheral surface of each of the photosensitive bodies 21Y to 21C with light, thereby charges remaining on the outer peripheral surfaces of the photosensitive bodies 21Y to 21C are released.

Further, in each of the toner image forming units 20Y to 20C, each of the primary transfer rolls 36Y to 36C applies a voltage to each of the photosensitive bodies 21Y to 21C, thereby charges remaining on the outer peripheral surface of each of the photosensitive bodies 21Y to 21C are released. As described above, in each of the toner image forming units 20Y to 20C, the exposing device 24 and the primary transfer roll 36 cooperate with each other to release the charges remaining on the outer peripheral surface of the photosensitive body 21, thereby erasing charges of the outer peripheral surface of each of the photosensitive bodies 21Y to 21C.

The photosensitive body 21K is an example of the most downstream image holding member, and is the photosensitive body 21 disposed on the most downstream side of the rotation direction (direction indicated by the arrow A) of the transfer belt 30 with respect to the secondary transfer position T2 among the four photosensitive bodies 21. That is, the photosensitive body 21K is disposed on the most downstream side in a case where the photosensitive body 21K is viewed from the secondary transfer position T2 toward the downstream side in the rotation direction (direction indicated by the arrow A) of the transfer belt 30.

The photosensitive bodies 21Y to 21C are examples of image holding members other than the most downstream image holding member. The photosensitive body 21C is an example of an immediately upstream image holding member disposed on the immediately upstream side of the most downstream image holding member. The immediately upstream image holding member is an image holding member disposed at a position closest to the most downstream image holding member (that is, the most upstream side) in a case of being viewed from the most downstream image holding member toward the upstream side.

The photosensitive body 21C is an example of a first image holding member. The photosensitive body 21M is an example of a second image holding member disposed on the immediately upstream side of the first image holding member. The second image holding member is an image holding member disposed at a position closest to the first image holding member (that is, the most upstream side) in a case of being viewed from the first image holding member toward the upstream side.

The photosensitive body 21Y is an example of the most upstream image holding member, and is the photosensitive body 21 disposed on the most upstream side of the rotation direction (direction indicated by the arrow A) of the transfer belt 30 with respect to the secondary transfer position T2 among the four photosensitive bodies 21. That is, the photosensitive body 21Y is disposed on the most upstream side in a case of being viewed from the secondary transfer position T2 toward the upstream side in the rotation direction of the transfer belt 30 (direction opposite to the direction indicated by the arrow A).

The exposing devices 24Y to 24C and the primary transfer rolls 36Y to 36C are examples of a first charge erasing unit. The charge erasing lamp 25 is an example of a second charge erasing unit.

The toner image forming units 20Y to 20K are similarly configured except that the toner image forming unit 20K includes the charge erasing lamp 25. Thus, in FIG. 1, the reference numerals of the respective units in the toner image forming units 20Y to 20C are omitted as appropriate.

Charge Erasing Time and Like in Toner Image Forming Units 20Y to 20K

Figure 2:
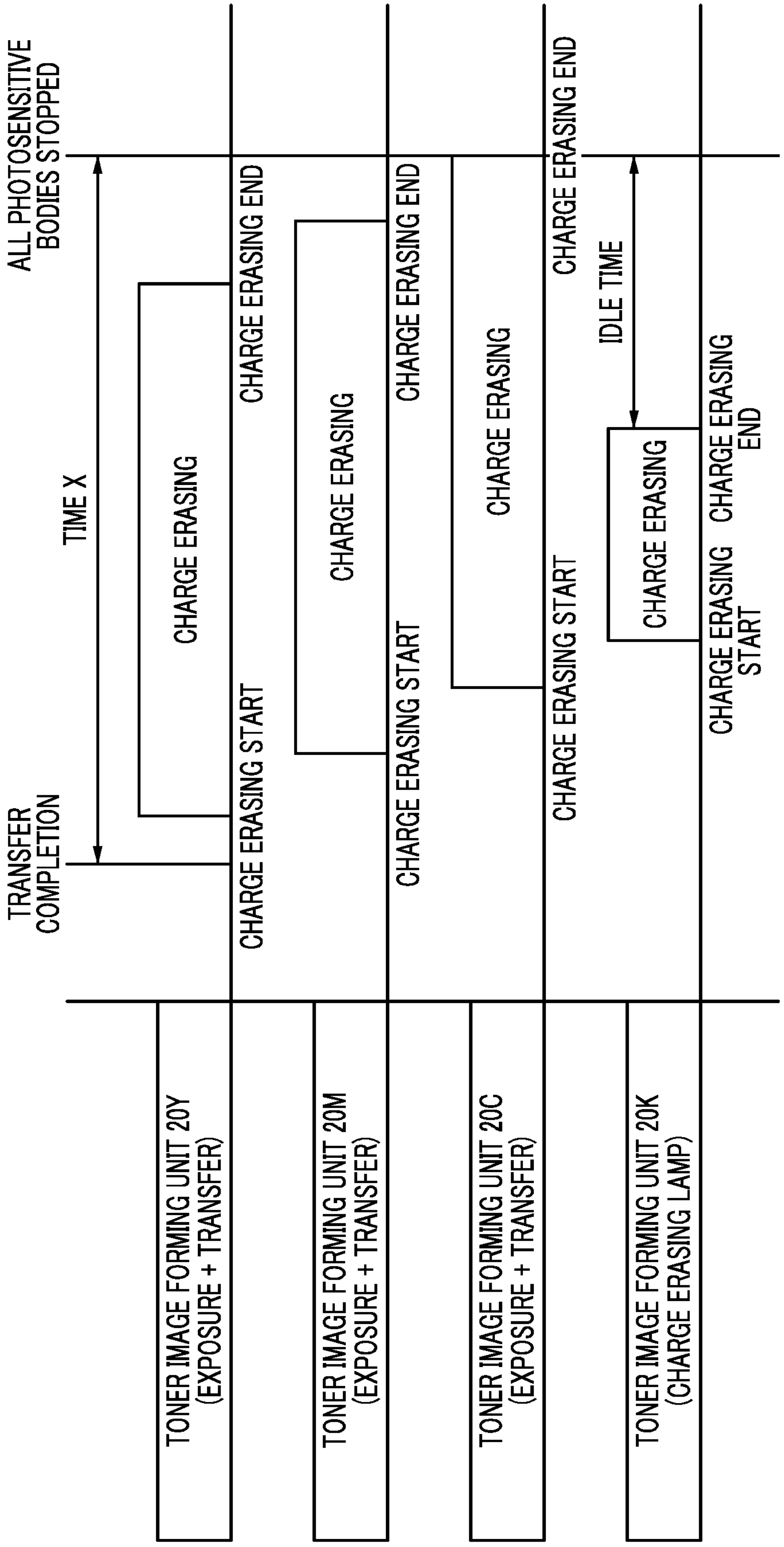
FIG. 2 is a schematic diagram showing a charge erasing time in a plurality of toner image forming units according to the present exemplary embodiment.

As shown in FIG. 2, the charge erasing time of the charge erasing lamp 25 in the toner image forming unit 20K is shorter than the charge erasing time of charge erasing by the exposing devices 24Y to 24C and the primary transfer rolls 36Y to 36C in the toner image forming units 20Y to 20C.

In the toner image forming unit 20K, the time from the start to the end of the charge erasing operation by the charge erasing lamp 25 corresponds to the time required for the photosensitive body 21K to rotate once. In the toner image forming units 20Y to 20C, the time from the start to the end of the charge erasing operation by the exposing devices 24Y to 24C and the primary transfer rolls 36Y to 36C corresponds to the time required for the photosensitive bodies 21Y to 21C to rotate 2.5 times. That is, the charge erasing time in the toner image forming units 20Y to 20C is 2.5 times the charge erasing time in the toner image forming units 20K. The charge erasing time in the toner image forming units 20Y to 20C is the same.

In each of the toner image forming units 20Y to 20K, the toner image is sequentially transferred from the photosensitive body 21 to the transfer belt 30, and then the charge erasing operation is sequentially performed. As shown in FIG. 2, charge erasing in each of the toner image forming units 20Y to 20K is started in the order of the toner image forming units 20Y, 20M, 20C, and 20K with a predetermined time difference.

Since the charge erasing time is the same in the toner image forming units 20Y to 20C, the charge erasing operation by the exposing devices 24Y to 24C and the primary transfer rolls 36Y to 36C is ended in the order of the toner image forming units 20Y, 20M, and 20C with a predetermined time difference.

The charge erasing operation by the charge erasing lamp 25 in the toner image forming unit 20K is ended by the time when the exposing devices 24Y to 24C and the primary transfer rolls 36Y to 36C end the charge erasing operation.

That is, the charge erasing operation in the toner image forming unit 20K has a later start timing and an earlier end timing than the charge erasing operation in any of the toner image forming units 20Y to 20C.

As a result, in the present exemplary embodiment, all rotations of the four photosensitive bodies 21 are stopped at a timing at which the charge erasing operation of the photosensitive body 21C in the toner image forming unit 20C is ended.

Effects of Present Exemplary Embodiment

In the present exemplary embodiment, in the four photosensitive bodies 21 in the toner image forming units 20Y to 20K, the charge erasing operation in all the photosensitive bodies 21 are ended, and then the rotation of all the photosensitive bodies 21 are stopped. The charge erasing time of the charge erasing lamp 25 in the toner image forming unit 20K is shorter than the charge erasing time by the exposing devices 24Y to 24C and the primary transfer rolls 36Y to 36C in the toner image forming units 20Y to 20C.

Figure 3:
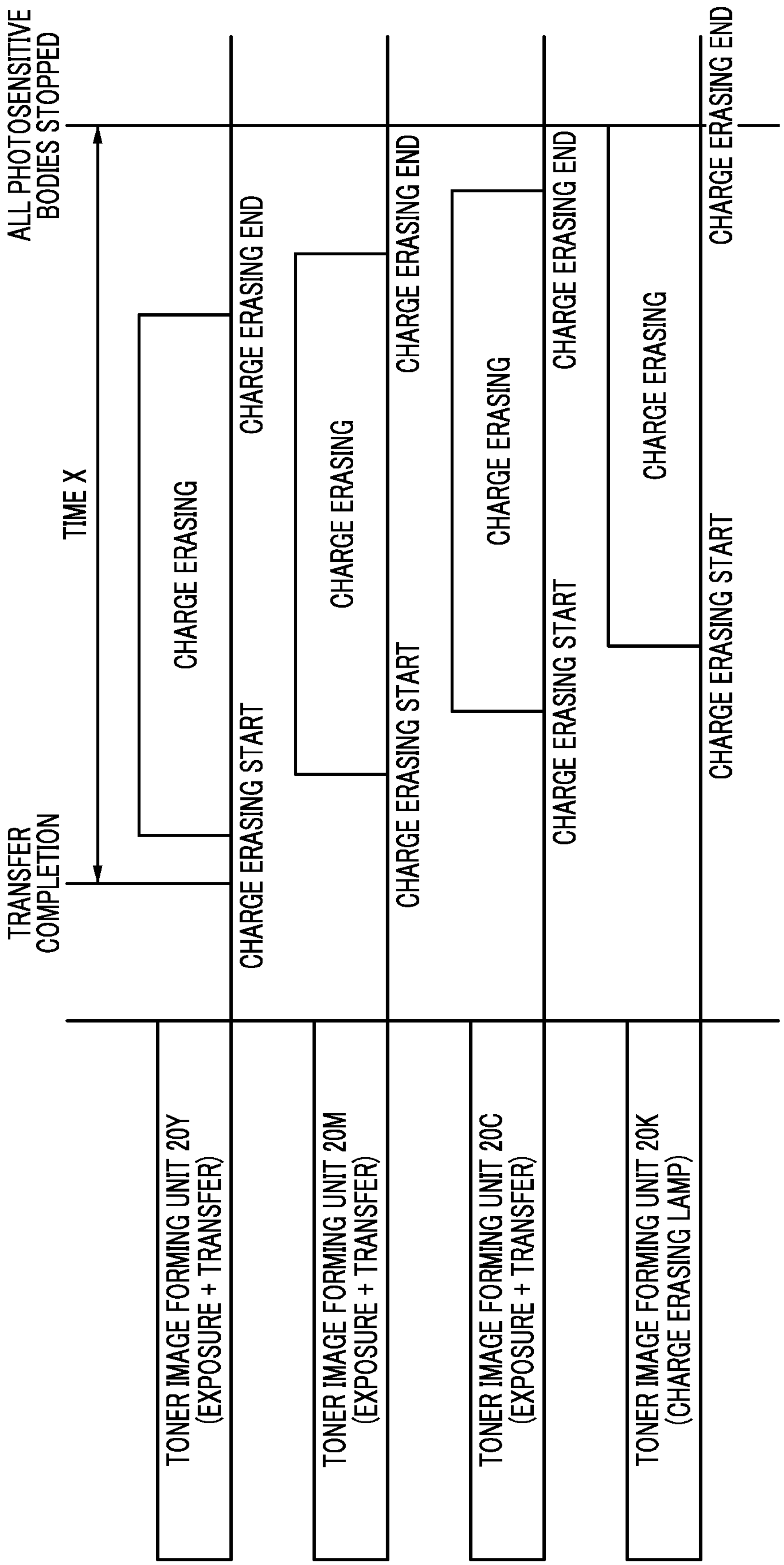
FIG. 3 is a schematic diagram showing a charge erasing time in a plurality of toner image forming units according to a comparative example.
Figure 4:
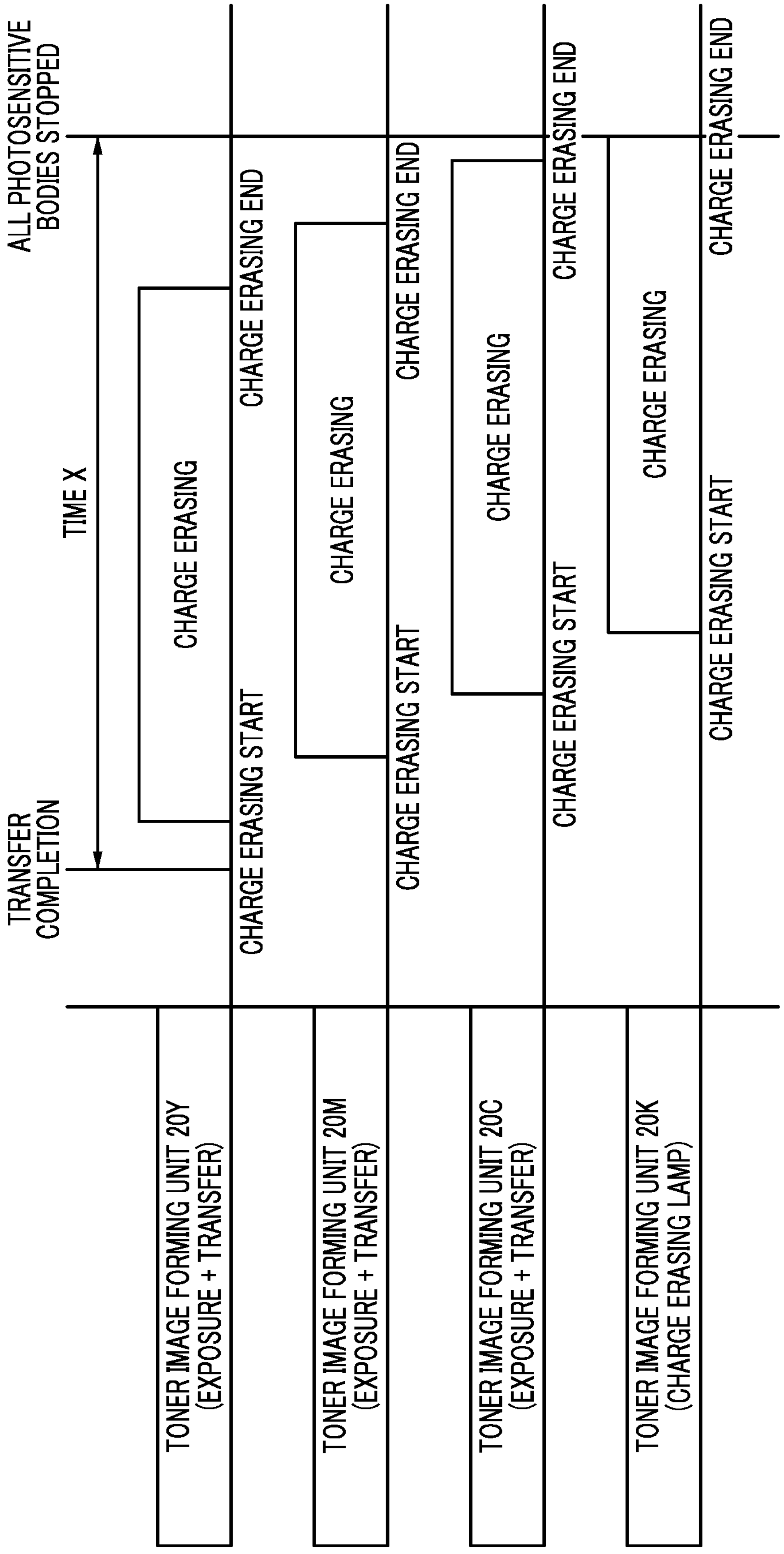
FIG. 4 is a schematic diagram showing a charge erasing time in a plurality of toner image forming units according to a modification example.
Figure 5:
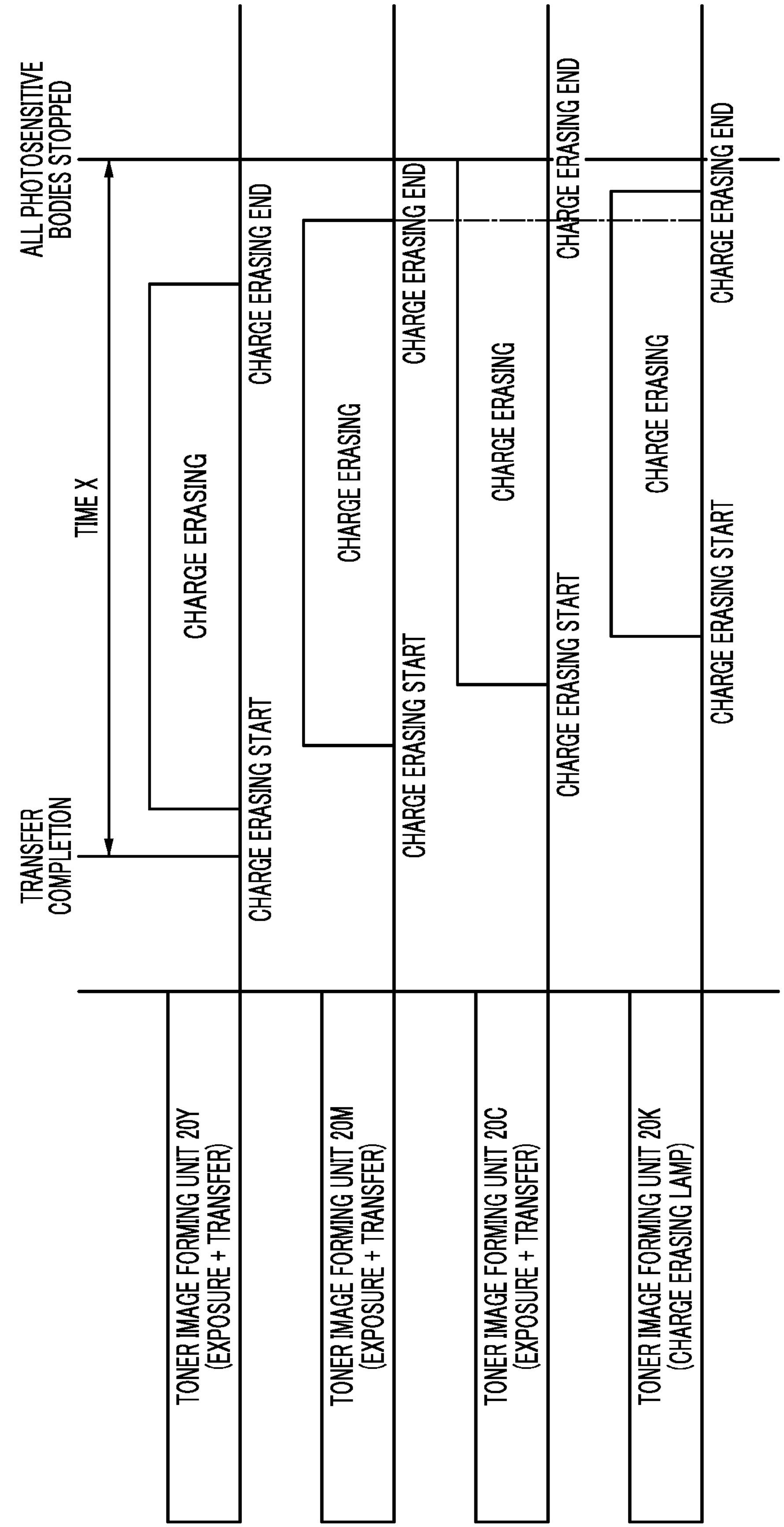
FIG. 5 is a schematic diagram showing a charge erasing time in a plurality of toner image forming units according to another modification example.
Figure 6:
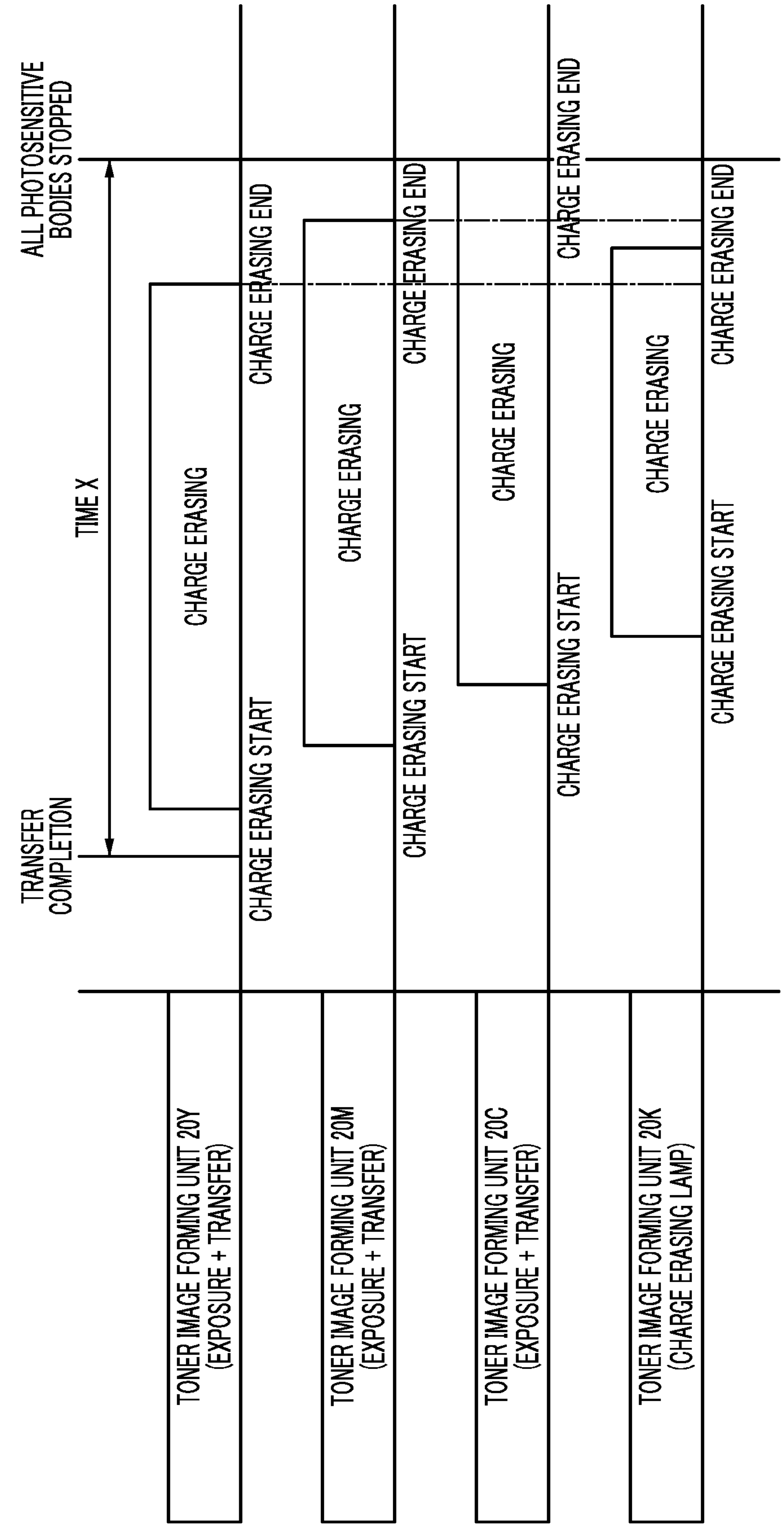
FIG. 6 is a schematic diagram showing a charge erasing time in a plurality of toner image forming units according to still another modification example.

Here, in a case where the charge erasing time of the charge erasing lamp 25 in the toner image forming unit 20K is the same as the charge erasing time by the exposing devices 24Y to 24C and the primary transfer rolls 36Y to 36C in the toner image forming units 20Y to 20C, as shown in FIG. 3 (referred to as Aspect A below), problems as follows arise.

That is, in the four photosensitive bodies 21, the rotations of all the photosensitive bodies 21 are stopped after the charge erasing operation in all the photosensitive bodies 21 has been ended. Thus, in a case where the charge erasing time in the toner image forming unit 20K is the same as the charge erasing time in the toner image forming units 20Y to 20C as in Aspect A, the time from completion of transfer of the toner image to the transfer belt 30 by the photosensitive body 21Y until rotations of all the four photosensitive bodies 21 are stopped (time X in FIG. 3) becomes longer. As a result, since the time taken for the four photosensitive bodies 21 and the transfer belt 30 to rotate in a state of being in contact with each other is long, the four photosensitive bodies 21 and the transfer belt 30 may be worn, and the lives of the four photosensitive bodies 21 and the transfer belt 30 may be reduced.

On the other hand, since the charge erasing time in the toner image forming unit 20K is shorter than the charge erasing time in the toner image forming units 20Y to 20C, the time from completion of transfer of the toner image to the transfer belt 30 by the photosensitive body 21Y until rotations of all the four photosensitive bodies 21 are stopped (time X in FIG. 2) is shortened as compared with Aspect A. As a result, reduction in the lives of the four photosensitive bodies 21 and the transfer belt 30 is suppressed.

In the present exemplary embodiment, the charge erasing lamp 25 disposed on the downstream side with respect to the primary transfer position T1 and on the upstream side with respect to the charging device 22 is used as a charge erasing unit in the toner image forming unit 20K.

Here, for example, in a case where the exposing device 24 is used as the charge erasing unit in the toner image forming unit 20K, in the toner image forming unit 20K, the rotation time of the photosensitive body 21Y from the primary transfer position T1 to the exposing device 24 is required in a period from completion of transfer of the toner image to the transfer belt 30 at the primary transfer position T1 to the start of the charge erasing operation. Therefore, the start of the charge erasing operation is delayed as compared with the case where the charge erasing lamp 25 is used.

In a case where, for example, the primary transfer roll 36Y is used as the charge erasing unit in the toner image forming unit 20K, the rotation time for the photosensitive body 21Y to rotate once is required in a period from completion of transfer of the toner image to the transfer belt 30 at the primary transfer position T1 to the start of the charge erasing operation. Therefore, the start of the charge erasing operation is further delayed as compared with the case where the exposing device 24 is used. As a result, the end time of the charge erasing operation in the toner image forming unit 20K is delayed, and the charge erasing time tends to become longer.

Therefore, according to the present exemplary embodiment, as compared with the case where the charge erasing unit in the toner image forming unit 20K is configured by at least one of the exposing device 24 or the primary transfer roll 36Y, the time from completion of transfer of the toner image to the transfer belt 30 by the photosensitive body 21Y until rotations of all the four photosensitive bodies 21 are stopped is shortened.

In the present exemplary embodiment, the exposing device 24 and the primary transfer roll 36 are used as the charge erasing unit in the toner image forming units 20Y to 20C. Therefore, it is possible to perform charge erasing of the photosensitive body 21 by sharing the charge erasing between the exposing device 24 and the primary transfer roll 36. Thus, it is possible to extend the life of the exposing device 24 as compared with the case where the charge erasing unit in the toner image forming units 20Y to 20C is configured by only the exposing device 24.

In the present exemplary embodiment, the charge erasing operation by the charge erasing lamp 25 in the toner image forming unit 20K is ended by the time when the exposing device 24C and the primary transfer roll 36C in the toner image forming unit 20C end the charge erasing operation.

Thus, as in the present exemplary embodiment, it is possible to stop all rotations of the four photosensitive bodies 21 at a timing at which the charge erasing operation of the photosensitive body 21C in the toner image forming unit 20C is ended. As a result, as compared to the case where the charge erasing operation in the toner image forming unit 20K is ended after the charge erasing operation in the toner image forming unit 20C has been ended, the time from completion of transfer of the toner image to the transfer belt 30 by the photosensitive body 21Y until the rotations of all the four photosensitive bodies 21 are stopped is shortened.

MODIFICATION EXAMPLES

In the present exemplary embodiment, the transfer belt 30 is used as the example of the transfer body, but the present invention is not limited thereto. As an example of the transfer body, for example, a transfer drum or the like may be used, and any structure may be used as long as the structure rotates and transfers the transferred image to the target transfer body at the transfer position.

Further, in the present exemplary embodiment, the recording medium P is used as an example of the target transfer body, but the present invention is not limited thereto. As an example of the target transfer body, for example, a transfer body such as a transfer belt or a transfer drum may be used, and any structure may be used as long as an image is transferred at the transfer position.

In the present exemplary embodiment, the four photosensitive bodies 21 are provided as an example of "a plurality of image holding members that rotate together with the transfer body at different positions along a rotation direction of the transfer body while outer peripheral surfaces of the image holding members come into contact with the transfer body, the image holding members on which a charge erasing operation is sequentially performed after images held on the outer peripheral surfaces sequentially transferred to the transfer body, and in which the charge erasing operation on all the image holding members has been ended, and then rotations of all the image holding members are stopped". Separately from the plurality of image holding members, other image holding members that hold an image to be transferred to the transfer body may be provided. As an example of the other image holding member, a photosensitive body provided in a toner image forming unit that is provided separately from the toner image forming units 20Y to 20K can be used. For example, the photosensitive body may be driven separately from the four photosensitive bodies 21 and may be configured to stop rotating at a timing different from the timings of the four photosensitive bodies 21. Even with such a configuration, the above-described effect is exhibited.

Further, in the present exemplary embodiment, the four photosensitive bodies 21 are provided as an example of the plurality of image holding members, but the present invention is not limited to this. As an example of the plurality of image holding members, two or three photosensitive bodies 21 may be used, and five or more photosensitive bodies 21 may be used.

In the present exemplary embodiment, as an example of the second charge erasing unit (that is, the charge erasing unit in the toner image forming unit 20K), the charge erasing lamp 25 disposed on the downstream side with respect to the primary transfer position T1 and on the upstream side with respect to the charging device 22 is used, but the present invention is not limited to this. As an example, the second charge erasing unit may be configured by at least one of the exposing device 24 or the primary transfer roll 36Y, and the charge erasing time in the toner image forming unit 20K may be shorter than the charge erasing time in the toner image forming units 20Y to 20C.

In the present exemplary embodiment, the exposing device 24 and the primary transfer roll 36 are used as an example of the first charge erasing unit (that is, the charge erasing unit in the toner image forming units 20Y to 20C), but the present invention is not limited to this. As the first charge erasing unit, for example, one of the exposing device 24 and the primary transfer roll 36 may be used.

In the present exemplary embodiment, the charge erasing operation by the charge erasing lamp 25 in the toner image forming unit 20K is ended by the time when the exposing device 24C and the primary transfer roll 36C in the toner image forming unit 20C end the charge erasing operation, but the present invention is not limited to this.

In the present exemplary embodiment, the charge erasing operation by the charge erasing lamp 25 in the toner image forming unit 20K is ended by the time when the exposing device 24M and the primary transfer roll 36M in the toner image forming unit 20M end the charge erasing operation, but the present invention is not limited to this.

Further, in the present exemplary embodiment, the charge erasing operation by the charge erasing lamp 25 in the toner image forming unit 20K is ended by the time when the exposing device 24Y and the primary transfer roll 36Y in the toner image forming unit 20Y end the charge erasing operation, but the present invention is not limited to this.

The present invention is not limited to the above-described exemplary embodiment, and various modifications, changes, and improvements can be made within a range without deviating from the gist thereof. For example, a plurality of the modification examples described above may be combined and configured as appropriate.

Additional Notes (((1)))

An image forming apparatus comprising:

a transfer body that rotates and transfers a transferred image to a target transfer body at a transfer position;

a plurality of image holding members that rotate together with the transfer body at different positions along a rotation direction of the transfer body while outer peripheral surfaces of the image holding members come into contact with the transfer body, the image holding members on which a charge erasing operation is sequentially performed after images held on the outer peripheral surfaces sequentially transferred to the transfer body, and in which the charge erasing operation on all the image holding members has been ended, and then rotations of all the image holding members are stopped;

a first charge erasing unit that erases charges of an outer peripheral surface of at least one image holding member other than a most downstream image holding member disposed on a most downstream side of the rotation direction with respect to the transfer position, among the plurality of image holding members; and a second charge erasing unit that erases charges of an outer peripheral surface of the most downstream image holding member, and has a charge erasing time shorter than a charge erasing time of the first charge erasing unit.

(((2)))

The image forming apparatus according to (((1))), wherein the first charge erasing unit includes at least one of an exposing unit that exposes the outer peripheral surface of the image holding member or a transfer unit that transfers an image held on the outer peripheral surface of the image holding member to the transfer body, and the second charge erasing unit is a charge erasing unit that is disposed on a downstream side of the transfer position by the transfer body and on an upstream side of a charging unit that charges the outer peripheral surface of the image holding member, in a rotation direction of the most downstream image holding member.

(((3)))

The image forming apparatus according to (((2))), wherein the first charge erasing unit includes both the exposing unit and the transfer unit.

(((4)))

The image forming apparatus according to any one of (((1))) to (((3))), wherein the first charge erasing unit erases charges of an outer peripheral surface of an immediately upstream image holding member disposed on an immediately upstream side of the most downstream image holding member among the plurality of image holding members, and the second charge erasing unit ends the charge erasing operation by an end of the charge erasing operation by the first charge erasing unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a toner image transferer that rotates and transfers a transferred image to a target toner image transferer at a transfer position;

a plurality of photosensitive drums that rotate together with the toner image transferer at different positions along a rotation direction of the toner image transferer while outer peripheral surfaces of the photosensitive drums come into contact with the toner image transferer;

a first charge erasing unit that erases charges of an outer peripheral surface of at least one photosensitive drum other than a most downstream photosensitive drum disposed on a most downstream side of the rotation direction with respect to the transfer position, among the plurality of photosensitive drums; and a second charge erasing unit that erases charges of an outer peripheral surface of the most downstream photosensitive drum and has a charge erasing time shorter than a charge erasing time of the first charge erasing unit, wherein a charge erasing operation is sequentially performed by the first charge erasing unit and the second charge erasing unit on all the photosensitive drums after completion of transfer of images from the outer peripheral surfaces to the toner image transferer, and rotations of all the photosensitive drums are stopped after the charge erasing operation on all the photosensitive drums has been ended.

2. The image forming apparatus according to claim 1, wherein the first charge erasing unit includes at least one of an exposing light that exposes the outer peripheral surface of one of the plurality of photosensitive drums or a transfer roll that transfers an image held on the outer peripheral surface of one of the plurality of photosensitive drums to the toner image transferer, and the second charge erasing unit is a charge erasing unit that is disposed on a downstream side of a position where the most downstream photosensitive drum transfer an image to the toner image transferer and on an upstream side of a charging unit that charges the outer peripheral surface of the most downstream photosensitive drum, in a rotation direction of the most downstream photosensitive drum.

3. The image forming apparatus according to claim 2, wherein the first charge erasing unit includes both the exposing light and the transfer roll.

4. The image forming apparatus according to claim 1, wherein the first charge erasing unit erases charges of an outer peripheral surface of an immediately upstream photosensitive drum disposed on an immediately upstream side of the most downstream photosensitive drum among the plurality of photosensitive drum, and the second charge erasing unit ends the charge erasing operation by the time when the first charge erasing unit ends the charge erasing operation.

5. An image forming apparatus comprising:
a transfer body that rotates and transfers a transferred image to a target transfer body at a transfer position;
a plurality of image holding members that rotate together with the transfer body at different positions along a rotation direction of the transfer body while outer peripheral surfaces of the image holding members come into contact with the transfer body;
first charge erasing means for erasing charges of an outer peripheral surface of at least one image holding member other than a most downstream image holding member disposed on a most downstream side of the rotation direction with respect to the transfer position, among the plurality of image holding members; and
second charge erasing means for erasing charges of an outer peripheral surface of the most downstream image holding member, the second charge erasing means having a charge erasing time shorter than a charge erasing time of the first charge erasing means,
wherein a charge erasing operation is sequentially performed by the first charge erasing means and the second charge erasing means on all the image holding members after completion of transfer of images from the outer peripheral surfaces to the transfer body, and
rotations of all the image holding members are stopped after the charge erasing operation on all the image holding members has been ended.

* * * * *